United States Patent [19]

Kagami

[11] Patent Number: 5,719,688
[45] Date of Patent: Feb. 17, 1998

[54] COMMUNICATION APPARATUS WHICH CAN CONNECT A PLURALITY OF COMMUNICATION LINES

[75] Inventor: Naoto Kagami, Yokohama, Japan

[73] Assignee: Canon Kabushiki Kaisha, Japan

[21] Appl. No.: 601,971

[22] Filed: Feb. 15, 1996

Related U.S. Application Data

[63] Continuation of Ser. No. 159,128, Nov. 30, 1993, abandoned.

[30] Foreign Application Priority Data

Dec. 2, 1992 [JP] Japan ................... 4-349801

[51] Int. Cl.⁶ ............................................. H04N 1/32
[52] U.S. Cl. ........................... 358/468; 358/400; 358/442
[58] Field of Search ............................ 358/400, 404, 358/408, 434, 444, 440, 468, 442; 379/100; H04N 1/32

[56] References Cited

U.S. PATENT DOCUMENTS

| | | | |
|---|---|---|---|
| 4,486,626 | 12/1984 | Kohler . | |
| 4,958,369 | 9/1990 | Tsuchida | 379/156 |
| 4,961,185 | 10/1990 | Sawada | 358/442 |
| 5,113,396 | 5/1992 | Kagami | 358/442 |
| 5,121,221 | 6/1992 | Hamano et al. | 358/426 |
| 5,142,568 | 8/1992 | Ogata et al. | 379/100 |
| 5,153,908 | 10/1992 | Kakizawa et al. | 389/157 |
| 5,191,604 | 3/1993 | Shigeeda | 379/100 |
| 5,204,895 | 4/1993 | Yoshiura | 379/100 |
| 5,276,687 | 1/1994 | Miyamoto | 379/100 |

FOREIGN PATENT DOCUMENTS

| | | | |
|---|---|---|---|
| 0325794 | 8/1989 | European Pat. Off. . | |
| 0337610 | 10/1989 | European Pat. Off. . | |
| 0361822 | 4/1990 | European Pat. Off. . | |
| 0365200 | 4/1990 | European Pat. Off. . | |
| 0544608 | 6/1993 | European Pat. Off. . | |
| 3433660 | 3/1986 | Germany . | |
| 0184867 | 10/1983 | Japan | 358/440 |
| 0101956 | 6/1984 | Japan | 358/440 |
| 0038145 | 2/1991 | Japan | 358/440 |

OTHER PUBLICATIONS

Pat. Abs. J., vol. 009, No. 292 (P-406), Nov. 19, 1985 (JP-A-60129806).

*Primary Examiner*—Thomas L. Stoll
*Attorney, Agent, or Firm*—Fitzpatrick, Cella, Harper & Scinto

[57] ABSTRACT

A communicating apparatus having a plurality of ports to connect a plurality of communication lines comprises a memory to store information indicating whether the plurality of communication lines are extensions of a private branch network or not, a designating circuit to designate whether the communication is to be executed through said extensions or not, and a selector to select one of the plurality of ports in accordance with the result of the designation of the designating circuit and the contents of the memory. The memory stores information indicating whether the communication lines are ISDN lines or PSTN lines. The selector includes a call generating circuit for generating a call in the G4 facsimile mode when the selected communication line is an ISDN line and for generating a call in the G3 facsimile mode when it is decided that the partner is not a G4 facsimile apparatus after completion of the call generation.

18 Claims, 9 Drawing Sheets

FIG. 3

| BOARD CLASSIFICATION (IN UNIT OF EACH BOARD) | | ① NONE<br>② ISDNi/f×1, PSTNi/f×1<br>③ Xi/f×1, PSTNi/f×1 |
|---|---|---|
| PORT CLASSIFICATION (IN UNIT OF EACH PORT) | EXTENSION/EXTERNAL LINE CLASSIFICATION | ① NO CONNECTION<br>② EXTERNAL LINE<br>③ EXTENSION<br>④ EXCLUSIVE-USE LINE |
| | USAGE CLASSIFICATION | ① ORDINARY<br>② RECEPTION ONLY<br>③ TRANSMISSION ONLY |
| | LINE CLASSIFICATION | ① ISDN<br>② PSTN<br>③ Xi/f<br>④ PBX<br>⑤ Ii/f EXCLUSIVE-USE LINE |

| BOARD CLASSIFICATION | ① ISDNi/f×1, PSTNi/f×1 ② NONE | | |
|---|---|---|---|
| PORT CLASSIFICATION | EXTENSION/EXTERNAL LINE CLASSIFICATION | $I_1$ | EXTERNAL LINE |
| | | $P_1$ | EXTENSION |
| | USAGE CLASSIFICATION | $I_1$ | ORDINARY |
| | | $P_1$ | ORDINARY |
| | LINE CLASSIFICATION | $I_1$ | ISDN |
| | | $P_1$ | PBX |

FIG. 6

| CONNECTION FORMAT | EXTERNAL LINE DESIGNATION | EXTENSION DESIGNATION | EXCLUSIVE-USE LINE |
|---|---|---|---|
| I₁ EXTERNAL, P₁ EXTERNAL | I₁(G4) → I₁(G3) | — | — |
| I₁ EXTERNAL, P₁ EXTENSION | I₁(G4) → I₁(G3) | P₁(G3) | — |
| I₁ EXTENSION, P₁ EXTERNAL | P₁(G3) | I₁(G4) → I₁(G3) | — |
| I₁ EXTENSION, P₁ EXTENSION | P₁(G3) | I₁(G4) → I₁(G3) | — |
| I₁ EXCLUSIVE, P₁ EXTERNAL | — | — | I₁(G4) (ONE-TOUCH DIAL) |
| I₁ EXCLUSIVE, P₁ EXTENSION | — | — | I₁(G4) (ONE-TOUCH DIAL) |

FIG. 8

① ISDNi/f×1, PSTNi/f×1
② ISDNi/f×1, PSTNi/f×1

| BOARD CLASSIFICATION (IN UNIT OF EACH BOARD) | | | |
|---|---|---|---|
| PORT CLASSIFICATION (IN UNIT OF EACH PORT) | EXTENSION/EXTERNAL LINE CLASSIFICATION | $I_1$ | EXTERNAL LINE |
| | | $P_1$ | EXTENSION |
| | | $I_2$ | EXCLUSIVE-USE LINE |
| | | $P_2$ | EXTERNAL LINE |
| | USAGE CLASSIFICATION | $I_1$ | ORDINARY |
| | | $P_1$ | ORDINARY |
| | | $I_2$ | ORDINARY |
| | | $P_2$ | RECEPTION ONLY |
| | LINE CLASSIFICATION | $I_1$ | ISDN |
| | | $P_1$ | PBX |
| | | $I_2$ | Ii/f EXCLUSIVE-USE LINE |
| | | $P_2$ | PSTN |

FIG. 9

| CONNECTION FORMAT | | | EXTERNAL LINE DESIGNATION | EXTENSION DESIGNATION | REMARKS |
|---|---|---|---|---|---|
| $I_1$ EXTERNAL | $I_2$ EXTERNAL | $P_2$ EXTERNAL | $I_1(G4) \rightarrow I_1(G3)$ ↑↓ $I_2(G3)$ | — | $I_2(G3)$ IS USED DURING $I_1(G3)$ USE |
| | | | $I_2(G4) \rightarrow I_2(G3)$ ↑↓ $I_1(G3)$ | — | $I_1(G3)$ IS USED DURING $I_2(G3)$ USE |
| | $I_2$ EXCLUSIVE | $P_2$ EXTERNAL | $I_1(G4) \rightarrow I_1(G3)$ ↑↓ $P_2(G3)$ | | $P_2(G3)$ IS USED DURING $I_1(G3)$ USE |
| $P_1$ EXTENSION | $I_2$ EXTERNAL | $P_2$ EXTERNAL | $I_1(G4) \rightarrow I_1(G3)$ ↑↓ $I_2(G3)$ | $P_1(G3)$ | $I_2(G3)$ IS USED DURING $I_1(G3)$ USE |
| | | | $I_2(G4) \rightarrow I_2(G3)$ ↑↓ $I_1(G3)$ | | $I_1(G3)$ IS USED DURING $I_2(G3)$ USE |
| | $I_2$ EXCLUSIVE | $P_2$ EXTERNAL | $I_1(G4) \rightarrow I_1(G3)$ ↑↓ $P_2(G3)$ | $P_1(G3)$ | $P_2(G3)$ IS USED DURING $I_1(G3)$ USE |
| $I_1$ EXTENSION | $I_2$ EXTERNAL | $P_2$ EXTERNAL | $I_2(G4) \rightarrow I_2(G3)$ ↑↓ $P_1(G3)$ | $I_1(G4) \rightarrow I_1(G3)$ | $P_1(G3)$ IS USED DURING $I_2(G3)$ USE |
| | | | $P_1(G3)$ $P_2(G3)$ | $I_1(G4) \rightarrow I_1(G3)$ | $P_2(G3)$ IS USED DURING $P_1(G3)$ USE |
| | $I_2$ EXCLUSIVE | $P_2$ EXTERNAL | $I_2(G4) \rightarrow I_2(G3)$ | $I_1(G4) \rightarrow I_1(G3)$ | |
| $I_1$ EXTENSION | $I_2$ EXCLUSIVE | $P_2$ EXTERNAL | $P_2(G3)$ | $I_1(G4) \rightarrow I_1(G3)$ | |

COMMUNICATION APPARATUS WHICH CAN CONNECT A PLURALITY OF COMMUNICATION LINES

This application is a continuation of application Ser. No. 08/159,128 Nov. 30, 1993 now abandoned.

BACKGROUND OF THE INVENTION

1. Field of the Invention

The present invention relates to a communication apparatus which can connect a plurality of communication lines.

2. Related Background Art

Hitherto, a multi-port facsimile apparatus having a plurality of communication ports has been used. Generally, in such a multi-port facsimile apparatus, some of the plurality of communication ports are connected to a public network such as an ISDN network (Integrated Service Digital Network), PSTN network (Public Switched Telephone Network), or the like and the other communication ports are connected to extensions of a private network. In this case, a respective denomination such as "port 1", "port 2", or the like is added to each communication port. When the operator performs a call generating operation, a desired communication port is designated by a selecting key in accordance with the transmission destination.

In many cases, however, the operator of the facsimile apparatus isn't aware which communication should be used and is merely aware whether the facsimile apparatus on the transmission destination side is connected to an extension or an external line. Therefore, the above conventional method of designating the communication port has a problem in that the operator who has no knowledge about the facsimile communication cannot easily understand the operation, and the operation is consequently troublesome.

SUMMARY OF THE INVENTION

It is an object of the invention to improve operating efficiency of a communicating apparatus having a plurality of communication ports.

Another object of the invention is to improve an operating efficiency of communicating apparatus connected to extensions of a private network and other lines.

According to one aspect of the invention is provided a communicating apparatus comprising: a memory to store information regarding whether one of a plurality of communication lines is an extension of a private network or not; and an operation unit to designate whether the communication is to be performed through the extension or not, wherein, when the execution of the communication is designated by the operation unit through the extension or another line, a communication port is selected in accordance with the memory contents.

Still another aspect of the invention is to provide a communicating apparatus comprising a memory to store information indicating whether one of plurality of communication lines is an extension of a private network or not or whether they are digital lines or analog lines; and an operation unit to designate whether the communication is to be executed through the extension or not, wherein, in the case where the digital line and the analog line are included in the extension designated by the operation unit or in another line, a communication port to which the digital line is connected is selected. This aspect also includes a method of selecting the communication port for such a communicating apparatus.

Still another aspect of the invention is to provide a communicating apparatus comprising: a memory to store information indicating whether one of a plurality of communication lines is an extensions of a private network or not; and a display for displaying the line classification in the case where the extensions and the other lines are included in the plurality of communication lines.

The above and other objects and features of the present invention will become more fully apparent from the following detailed description of the preferred embodiments and the appended claims with reference to the accompanying drawings.

BRIEF DESCRIPTION OF THE DRAWINGS

FIG. 3 is a diagram showing set registration items for a line registration table;

FIG. 6 is a diagram showing transmitting process in the facsimile apparatus of the 2-port type;

FIG. 8 is a diagram showing the contents of set registration in a line registration table corresponding to the line connection example of FIG. 7;

FIG. 9 is a diagram showing the transmitting process in the facsimile apparatus of the 4-port type.

DETAILED DESCRIPTION OF THE PREFERRED EMBODIMENTS

Embodiments of the invention will now be described hereinbelow with reference to FIGS. 1 to 10.

Figure 1:
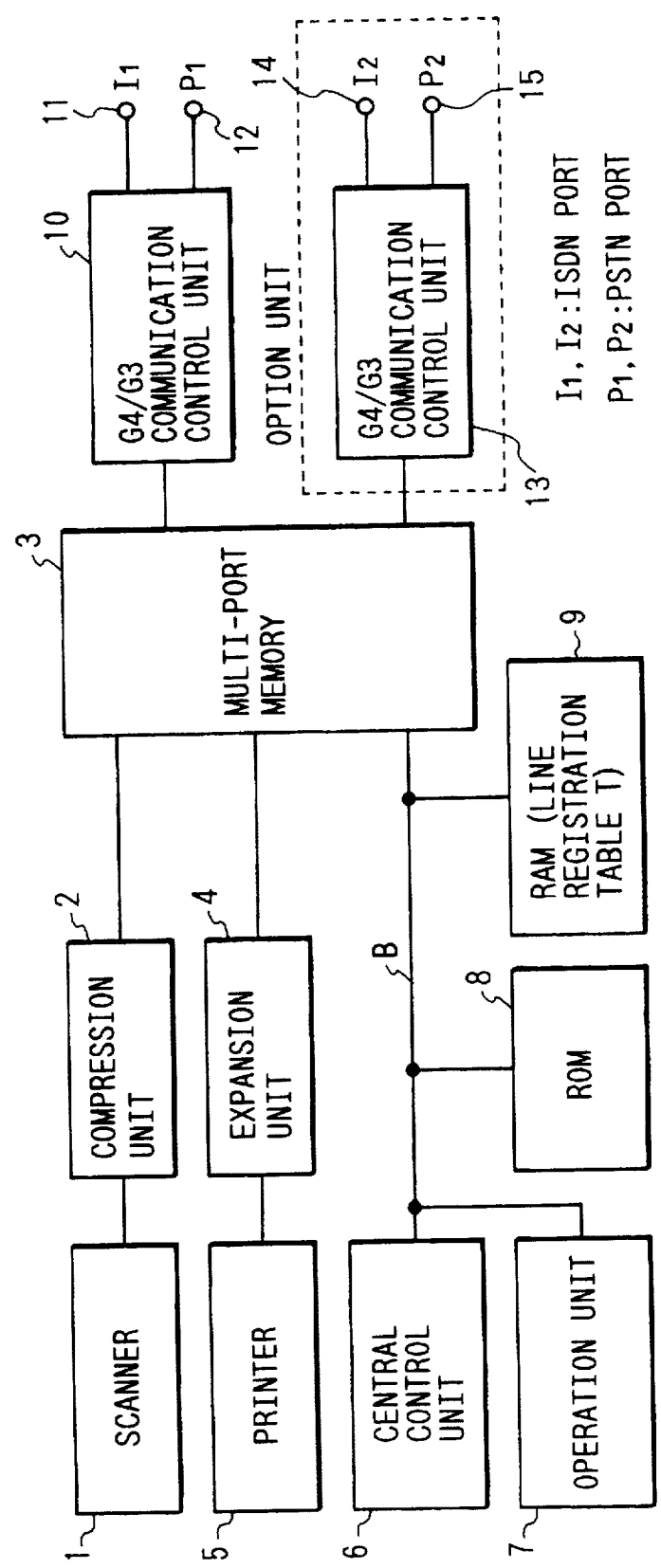
FIG. 1 is a block diagram showing a schematic construction of a facsimile apparatus according to an embodiment of the invention.

FIG. 1 is a block diagram showing a schematic construction of a facsimile apparatus according to an embodiment of the invention. A scanner 1 to read an image of an original is connected to a multi-port memory 3 through a compression unit 2 for encoding and compressing the read image data into compressed data by a method based on the MH, MR, MMR, or the like method. The multi-port memory 3 is connected to an expansion unit 4 for expanding the encoded and compressed image data and reconstructing the original image data. A printer 5 to print the original image is connected to the expansion unit 4.

On the other hand, a central control unit 6 to control the whole apparatus is connected to the multi-port memory 3 through a bus B. An operation unit 7 to operate the apparatus, a ROM 8 in which a control program for the apparatus has been stored, and a RAM 9 in which control information and a line registration table T have been stored, are connected to the bus B.

A communication control unit 10 to interface a G3 communication control and a communication control and the line under control of the central control unit 6 is connected to the multi-port memory 3. The communication control unit 10 is provided with a communication port 11 having an ISDN i/f (interface) and a communication port 12 having a PSTN i/f. Further, a communication control unit 13 with the same construction as that of the communication control unit 10 can optionally be connected to the multi-port memory 3.

Figure 2:
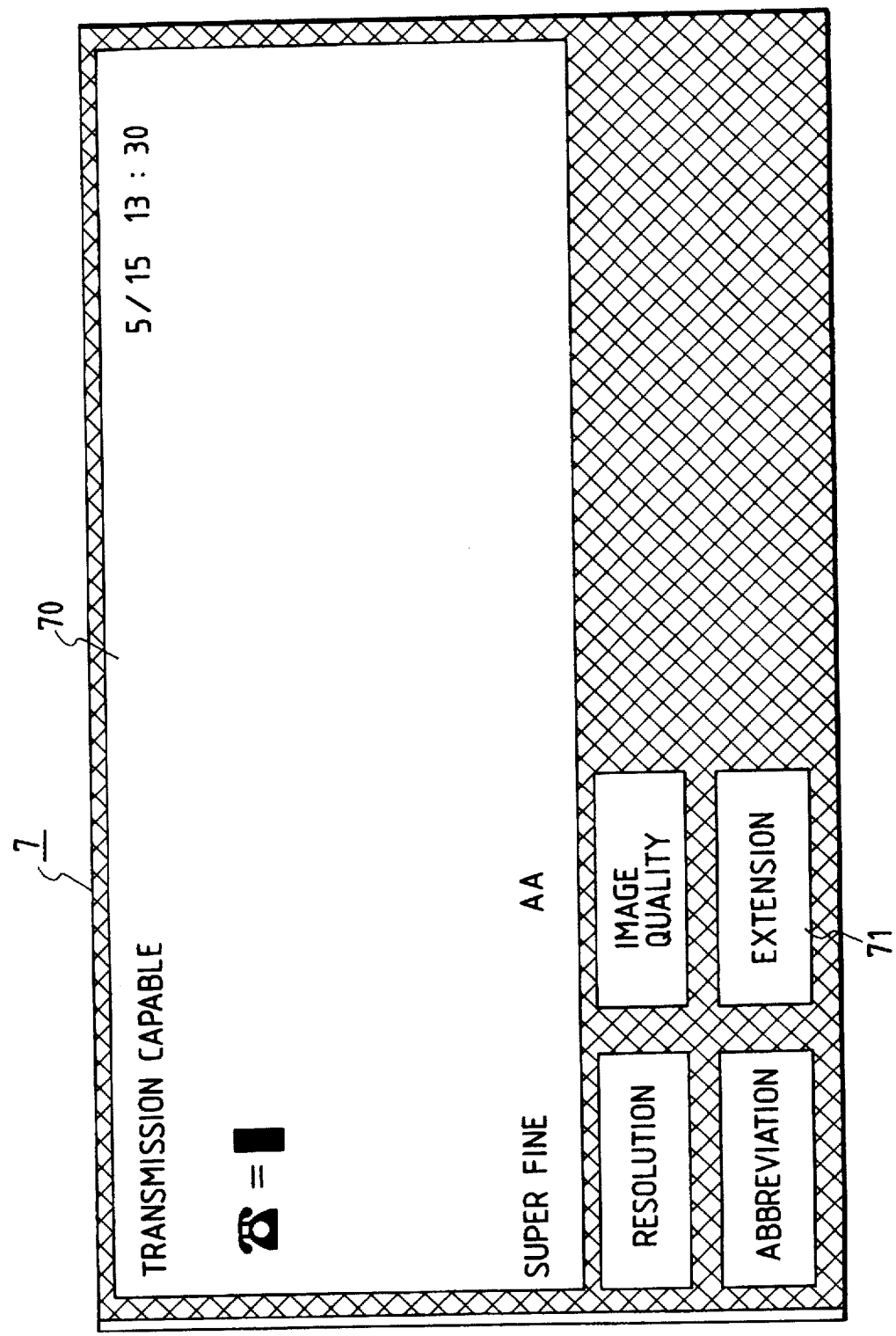
FIG. 2 is a front view showing a construction of an operation unit.

As shown in FIG. 2, a liquid crystal display surface 70 to display a state of the facsimile communication is provided for the operation unit 7. Various kinds of control buttons including a call selection button 71 is arranged in the lower portion of the liquid crystal display surface 70. Various kinds of operation buttons are arranged in the side portion of the liquid crystal display surface 70. The above various kinds of control buttons are constructed by a liquid crystal touch panel. Each time the call selection button 71 is touched, the display content of "EXTENSION" or "EXTERNAL LINE" is cyclically switched on the basis of the control of the central control unit 6.

In addition to the above buttons, a ten-key to perform the dial inputting operation and a one-touch key are also included in the operation unit 7.

By touching the various control buttons and the operation of the various operation buttons in the operation unit 7, the central control unit 6 controls the facsimile communicating operations of the communication control units 10 and 13 through the multi-port memory 3. The transmission image data from the compression unit 2 is transferred to the communication control units 10 and 13 through the multi-port memory 3. The reception image from the line is received through the communication control units 10 and 13 and is temporarily stored into the multi-port memory 3. After that, the reception image is transferred to the expansion unit 4 and is recorded by the printer 5.

FIG. 3 is a diagram showing set registration items to be set and registered into the line registration table T in the RAM 9 when the facsimile apparatus is installed. The set registration items relate mainly either to board classification or to port classification. The board classification is provided to distinguish the boards on which the communication control units 10 and 13 are mounted. Specifically speaking, any one of the items (1) "NONE" (no board is installed yet), (2) ISDNi/fxl, PSTNi/fxl, and (3) Xi/fxl, PSTNi/fxl is set and registered. "ISDNi/f" shows that the apparatus has an i/f (interface) such as ISDN network as a public network, high speed digital i/f, exclusive-use line, or the like. "Xi/f" shows that the apparatus has an interface based on the X21 or X21bis provision of the X series recommendation of the CCITT.

The set registration items of the port classification is classified into three classifications such as extension/ external line classification, usage classification, and line classification. As set registration items of the extension/ external line classification, there are (1) "NO CONNECTION", (2) "EXTERNAL LINE", (3) "EXTENSION" and (4) "EXCLUSIVE USE LINE". As set registration items of the usage classification, there are (1) "ORDINARY", (2) "RECEPTION ONLY", and (3) "TRANSMISSION ONLY". A communication port which has been set for reception only doesn't execute the transmitting operation. Further, as set registration items of the line classification, there are (1) ISDN, (2) PSTN, (3) Xi/f, (4) PBX (analog PBX: private Branch Exchange), and (5) Ii/f EXCLUSIVE-USE LINE.

Explanation will now be made with respect to how to set and register the board classification and port classification on the basis of the actual line connection example and how to execute the facsimile communicating process by the apparatus in such a set registration state.

Figures 4, 5:
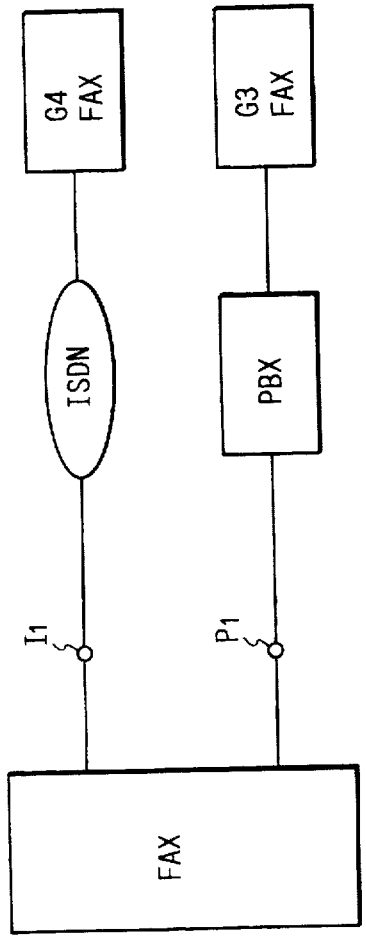
FIG. 4 is a diagram showing an example of line connection in a facsimile apparatus of the 2-port type.
FIG. 5 is a diagram showing the contents of set registration in the line registration table corresponding to the line connection example of FIG. 4.

The case of the 2-port type will be first described. For example, as shown in FIG. 4, it is now assumed that an $I_1$ port is connected to the ISDN network of the external line and that a $P_1$ port is connected to the analog PBX of the extension. In the above connection example, the item contents as shown in FIG. 5 are set and registered into the line registration table T. Namely, with respect to the board on which the communication control unit 10 is installed, (1) "ISDNi/fxl, PSTNi/fxl" is set and registered as a board classification. With respect to the board on which the communication control unit 13 is mounted, (2) "NONE" is set and registered. With regard to the port classification, "EXTERNAL LINE" is set and registered as an extension/external line classification with respect to the $I_1$ port, while "EXTENSION" is set and registered with respect to the $P_1$ port. As a usage classification, "ORDINARY" is set and registered with respect to both of the $I_1$ port and the $P_1$ port. As a line classification, "ISDN" is set and registered with respect to the $I_1$ port, while "PBX" is set and registered with respect to the $P_1$ port.

In a state in which the classifications have been set and registered as mentioned above, when the operator selects either one of the extension and the external line by the touching operation of the call selection button 71 in FIG. 2 and dials the partner's facsimile number by the operation unit 7, the central control unit 6 refers to the registration contents in the line registration table T and automatically selects the communication port and the G3 or G4 communication mode as shown in FIG. 6. FIG. 6 shows the selecting processes of the communication port and the G3 or G4 communication mode corresponding to all of the line connection formats in case of the 2-port type. A portion surrounded by double lines corresponds to the connection format of FIG. 4.

That is, in the connection format of FIG. 4, when the operator selects the external line, the central control unit 6 performs a call generation in the G4 mode [$I_1$(G4)] through the $I_1$ port. As a result of the communication in the G4 mode [$I_1$(G4)], when it is determined that the partner side is the G3 facsimile by a response from the ISDN, the central control unit 6 falls back to the G3 mode and again generates a call [$\rightarrow I_1$(G3)] through the $I_1$ port. When the operator selects the extension, the central control unit 6 generates a call in the G3 mode [$P_1$(G3)] through the $P_1$ port.

As shown in FIG. 6, in the case where the connection format is set to "$I_1$ EXTERNAL, $P_1$ EXTERNAL" and both of the ports are connected to the external line, or in the case where the connection format is set to "$I_1$ EXTENSION, $P_1$ EXTENSION" and both of the ports are connected to the extension, the central control unit 6 displays none of the external line and the extension for the call selection button 71 on the touch panel, and a call is automatically generated to the external line or extension even when the call selection button 71 is not touched. In the case where, on the other hand, the exclusive-use line is connected such that the connection format is set to, for example, "$I_1$ EXCLUSIVE, $P_1$ EXTERNAL", the facsimile number of the partner apparatus connected to the exclusive-use line is preliminarily registered, thereby simplifying the operation upon transmission by connecting the line by the one-touch dial.

The central control unit 6 automatically selects the above port and mode on the basis of the following rules.

(a) The operator executes only the selection between the extension/external line and the exclusive-use line without executing the selection designation of the port and mode. The exclusive-use line is selected by inputting the number to designate the exclusive-use line. In case of the one-touch dial, when the number to designate the exclusive-use line is registered, the central control unit 6 selects the exclusive-use line.

(b) In the case where the ISDNi/f is included in the extension/external line port which was selected and designated, the port having the ISDNi/f is preferentially selected and first executes the communication in the G4 mode.

(c) As a result of the communication in the G4 mode, when it is decided that the partner apparatus is the G3 facsimile apparatus, the apparatus falls back to the G3 mode by the ISDNi/f port and again performs the communication. In this case, the reason why the PSTNi/f port is not used is because an amount 3 of loss in the subscriber's line is larger than that in case of the ISDNi/f and the line quality deteriorates.

(d) The call generation from the communication port which was registered as a reception only port is inhibited.

The program describing the transmitting process as shown in FIG. 6 which is based on such rules has been previously stored in the ROM 8. The item contents according to the line connection format as shown in FIG. 5 are set and registered into the line registration table T when the apparatus is installed. Due to this, the central control unit 6 executes the facsimile communication based on the above rules with reference to the line registration table T.

The case of the 4-port type will now be described with reference to FIGS. 7 to 9. For example, as shown in FIG. 7, in the facsimile apparatus having four ports of $I_1$, $P_1$, $I_2$, and $P_2$, it is now assumed that the $I_1$ port is connected to the ISDN network of the external line, the $P_1$ port is connected to the analog PBX of the extension, the $I_2$ port is connected to the Ii/f high speed digital exclusive-use line of the external line which uses the $I_2$ port only for reception, and the $P_2$ port is connected to the PSTN network of the external line.

In the connection format, item contents as shown in FIG. 8 are set and registered into the line registration table T. That is, as a board classification, with respect to the board on which the communication control unit 10 is mounted, (1) "ISDNi/fx1, PSTNi/fx1" is set and registered. With respect to the board on which the communication control unit 13 is mounted, (2) "ISDNi/fx1, PSTNi/fx1" is set and registered. On the other hand, as for the port classification as an extension/external line classification, "EXTERNAL" is set and registered with respect to the $I_1$ port, "EXTENSION" is set and registered with regard to the $P_1$ port, "EXCLUSIVE" is set and registered with respect to the $I_2$ port, and "EXTERNAL" is set and registered with regard to the $P_2$ port. As a usage classification, "ORDINARY" is set and registered with respect to all of the $I_1$, $P_1$, and $I_2$ ports, while "RECEPTION ONLY" is set and registered with regard to the $P_2$ port. As a line classification, "ISDN" is set and registered with respect to the $I_1$ port, "analog PBX" is set and registered with regard to the $P_1$ port, "Ii/f high speed digital exclusive-use line" is set and registered with regard to the $I_2$ port, and "PSTN" is set and registered with respect to the $P_2$ port, respectively.

The transmitting process (selection of the communication port and communication mode) in the facsimile apparatus of the 4-port type is executed as shown in FIG. 9. The communicating process in FIG. 9 corresponds to all of the line connection formats in case of the 4-port type. The portion surrounded by double lines corresponds to the connection format in FIG. 7.

Figure 7:
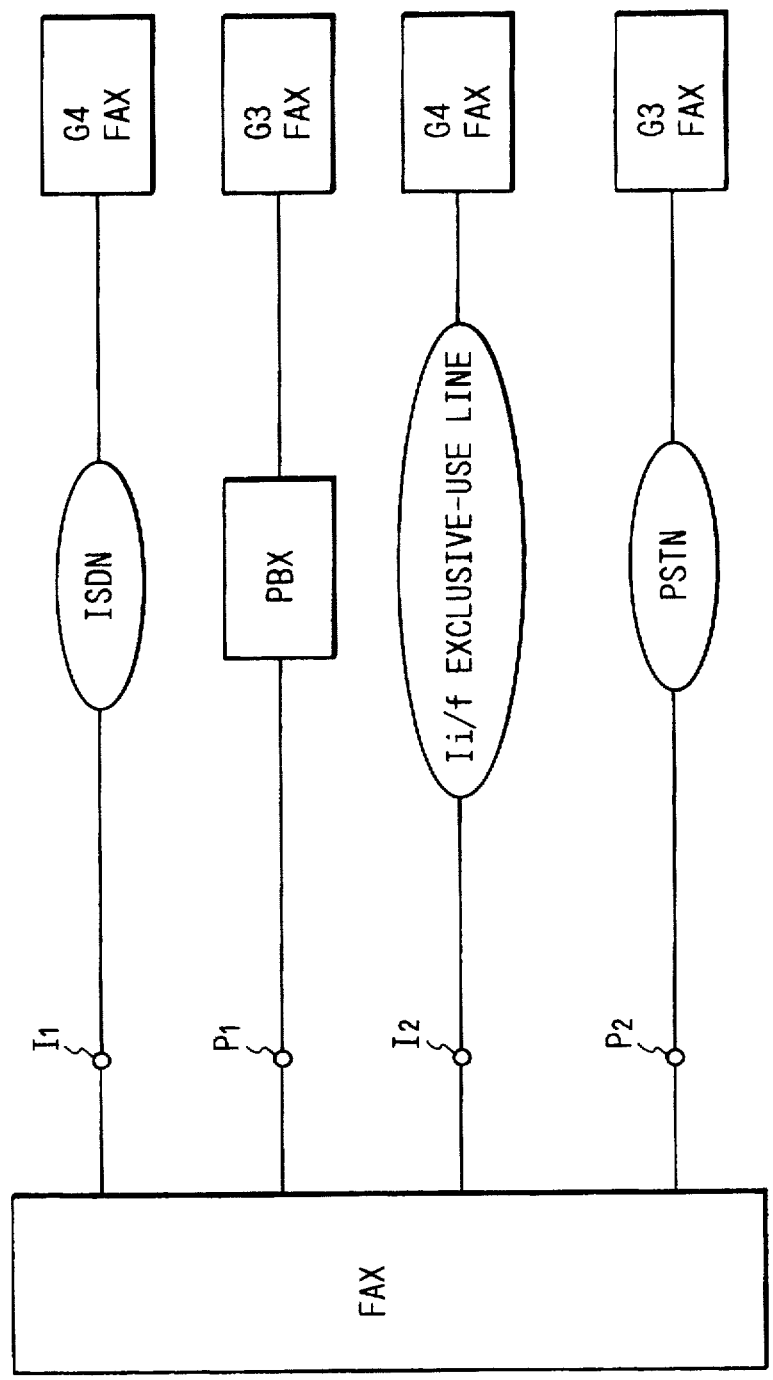
FIG. 7 is a diagram showing a line connection example in a facsimile apparatus of the 4-port type.

That is, in the state in which the apparatus is installed in the line connection format of FIG. 7 and the contents as shown in FIG. 8 have been set and registered in the line registration table T, when the operator selects the external line by the touching operation of the call selection button 71 in FIG. 2, the central control unit 6 generates a call in the G4 mode $[I_1(G4)]$ through the $I_1$ port as shown by double lines in FIG. 9. As a result of the communication in the G4 mode $[I_1(G4)]$, when it is determined that the partner side apparatus is the G3 facsimile apparatus due to a response from the ISDN, the apparatus falls back to the G3 mode and again generates a call through the $I_1$ port [$\rightarrow I_1(G3)$]. On the other hand, when the operator selects the extension, the central control unit 6 generates a call through the $P_1$ port in the G3 mode $[P_1(G3)]$.

As mentioned above, the rules to automatically select the communication port and the communication mode in case of the 4-port type are the same as those in case of the 2-port type and are generally the same as those in case of the N-port type. However, in the case where a plurality of ports connected to the external line exist as shown in the column of remarks and it is determined that the partner side is the G3 facsimile apparatus as a result of the first communication in the G4 mode, so long as the port which generated the first call in the G4 mode at the time point of the regeneration of the call is in use state, the apparatus again generates a call in the G3 mode through another port connected to the external line.

Figure 10:
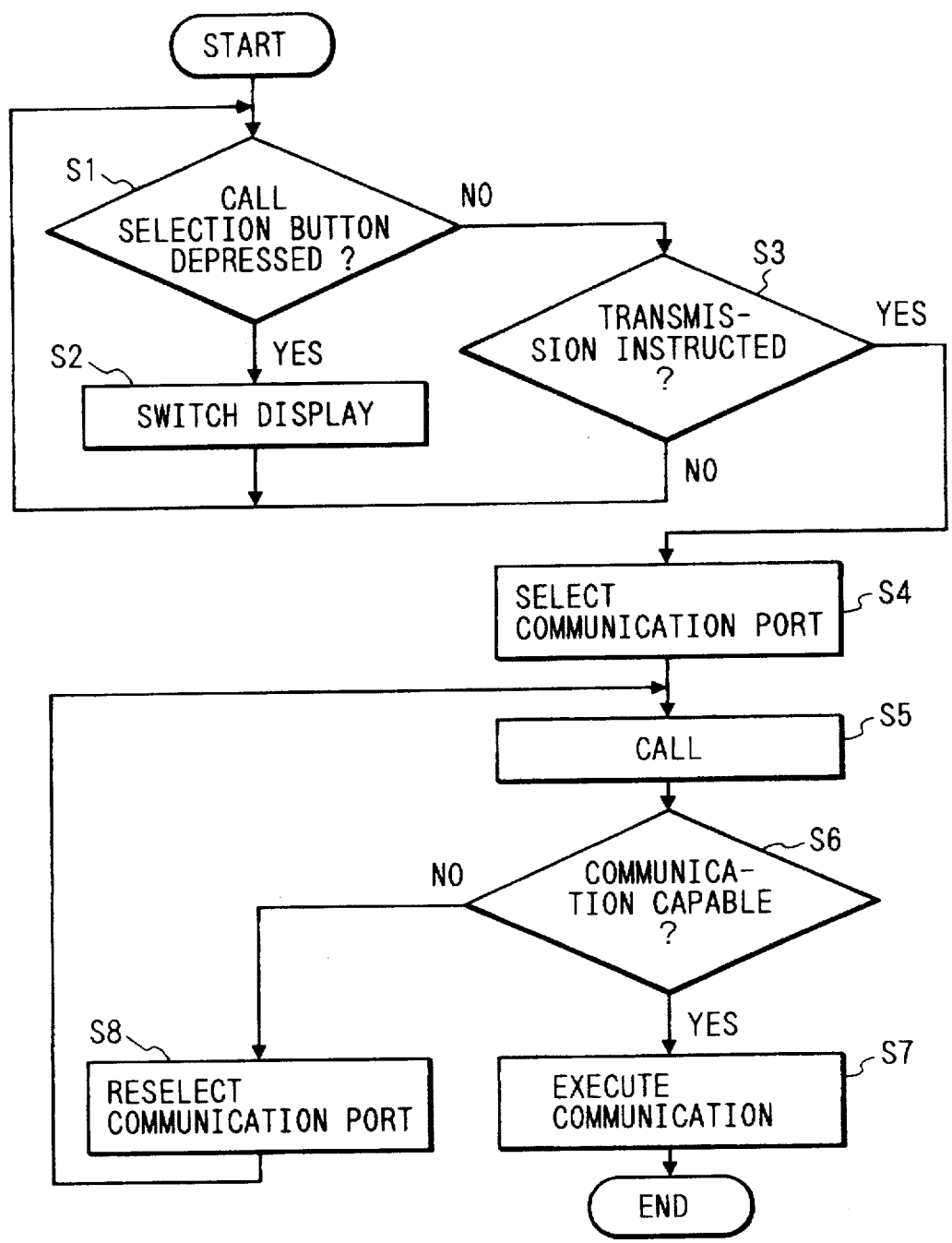
FIG. 10 is a flowchart showing the operation of the embodiment upon transmission.

The transmitting operation in the embodiment will now be described with reference to FIG. 10.

When the call selection button 71 is depressed (step S1), the central control unit 6 switches the display to the external line so long as the extension is displayed in the call selection button 71 and also switches the display to the extension so long as the external line is displayed in the call selection button 71 (S2).

When a transmission destination side is designated by the ten-key of the operation unit 7 and the start key is depressed or the one-touch key is depressed (S3), the central control unit 6 judges whether the number to designate the exclusive-use line is included in the number of the transmission destination side or not. When the number to designate the exclusive-use line is included, the communication port to which the exclusive-use line is connected is selected with reference to the line registration table T. When the number to designate the exclusive-use line is not included, the central control unit 6 selects the communication port connected to the extension or external line in accordance with the state of the call selection button 71 (S4) and generates a call in the G4 facsimile mode to the transmission destination side designated in step S3 (S5).

In step S4, the central control unit selects the ISDN line to perform the communication of a high quality in the case where it is determined on the basis of the line registration table T that the ISDN line and PSTN line exist in the extension or external line corresponding to the designation of the call selection button 71.

When the apparatus can communicate with the transmission destination side (S6), the communication is executed.

When the apparatus cannot communicate with the transmission destination side in step S6, the communication port is again selected (S8) and the call is again generated (S5).

In the case where the ISDN line is selected in step S4 and the call is generated in the G4 facsimile mode in step S5, when it is determined that the transmission destination side is the G3 facsimile apparatus from the ISDN in step S6, the central control unit 6 again selects the ISDN line in step S8 and generates a call in the G3 facsimile mode in step S5. When the ISDN line is in use when the call is again generated, the central control unit 6 selects the PSTN line in step S8 and generates a call in the G3 facsimile mode in step S5.

Although the present invention has been described above on the basis of the preferred embodiments, the invention is not limited to the constructions of the above embodiments but many variations and modifications such as a key telephone system and the like are possible within the scope of the claims of the invention.

What is claimed is:

1. A communicating apparatus having a plurality of ports to connect a plurality of communication lines, comprising:

memory means for storing first information which includes information representing whether the communication line connected to each of the plurality of ports is at least an external line or an extension and second information which represents a kind of communication line to be connected to each of the plurality of the second information including information representing whether the connected line is an analog communication line or a digital communication line;

designating means for designating whether an outgoing call to be subsequently executed is executed to the external line or the extension; and selecting means for determining, according to the designation by said designating means and the first information stored in said memory means, to which communication line of the port the outgoing call is to be executed, and for selecting, from among a plurality of communication protocols, the communication protocol to be executed according to the second information corresponding to the determined port.

2. An apparatus according to claim 1, wherein the second information includes information representing whether the connected line is an ISDN line or a PSTN line.

3. An apparatus according to claim 2, wherein said selecting means includes call generating means for generating a call in a G4 facsimile mode when the selected communication line is the ISDN line and for generating a call in a G3 facsimile mode when it is determined that the partner is not a G4 facsimile apparatus after completion of the call generation.

4. An apparatus according to claim 3, wherein when the ISDN line is included in the plurality of communication lines corresponding to the designation by said designating means, said selecting means selects the port to which said included ISDN line is connected.

5. An apparatus according to claim 1, wherein said memory means further stores third information to be used for limiting an objective of use of the port, and said selecting means controls a communication mode to be executed, according to the third information.

6. An apparatus according to claim 1, wherein the first information includes information representing that the communication line is an exclusive-use line, and said designating means can designate that the outgoing call is executed to the exclusive-use line.

7. An apparatus according to claim 6, wherein when the number to designate the exclusive-use line is stored in a one-touch dial, said selecting means selects the port to which the exclusive-use line is connected.

8. An apparatus according to claim 1, wherein said designating means includes a touch panel for displaying according to said memory means when said extensions and another line are included in said plurality of communication lines.

9. A communication apparatus having a plurality of ports to connect a plurality of communication lines, comprising:

memory means for storing first information which includes information representing whether the communication line connected to each of the plurality of ports is at least an external line or an extension, and second information which represents a kind of the communication line to be connected to each of the plurality of ports, the second information including information representing whether the connected line is a first communication line or a second communication line;

designating means for designating whether an outgoing call to be subsequently executed is executed to the external line or the extension; and selecting means for selecting, according to the designation by said designating means and the first and second information stored in said memory means, to which communication line of the port the outgoing call is to be executed.

10. An apparatus according to claim 9, wherein said selecting means includes call generating means for generating a call in a G4 facsimile mode to the digital line and for generating a call in a G3 facsimile mode when it is determined after completion of the call generation that a partner is not a G4 facsimile apparatus.

11. An apparatus according to claim 9, wherein said designating means includes a touch panel for displaying according to said memory means when said extensions and another line are included in said plurality of communication lines.

12. An apparatus according to claim 9, wherein said digital lines include an ISDN line.

13. A communicating apparatus having a plurality of ports to connect a plurality of communication lines, comprising:

memory means for storing first information which includes information representing whether the communication line connected to each of the plurality of ports is at least an external line or an extension, and second information which represents a kind of the communication line to be connected to each of the plurality of ports, the second information including information representing whether the connected line is an analog communication line or a digital communication line;

display means for displaying a classification of the lines being connected to the parts in accordance with the first information stored in said memory means;

designating means for designating whether an outgoing call to be subsequently executed is executed to the external line or the extension; and selecting means for selecting, according to the designation by said designating means and the first and second information stored in said memory means, to which communication line of the port the outgoing call is to be executed.

14. An apparatus according to claim 13, wherein said display means includes selecting means for selecting either one of said plurality of communication lines in the case where said extensions and another line are included in said plurality of communication lines.

15. A line selection method in a communication apparatus which has a plurality of ports to connect a plurality of communication lines, said method comprising the steps of:

previously registering first information which includes information representing whether the communication line connected to each of the plurality of ports is at least an external line or an extension, and second information which represents a kind of the communication line to be connected to each of the plurality of ports, the second information including information representing whether the connected line is a first communication line or a second communication line;

designating whether an outgoing call to be subsequently executed is executed to the external line or the extension; and selecting, according to the designation in said designating step and the first and second information, to which communication line of the port the outgoing call is to be executed.

16. A facsimile communicating apparatus having a plurality of ports to connect a public network and a private network, said facsimile communication apparatus comprising:

memory means for storing first information which includes information representing whether the communication line connected to each of the plurality of ports is at least an external line or an extension, and second information which represents a kind of the communication line to be connected to each of the plurality of ports, the second information including information representing whether the connected line is an analog communication line or a digital communication line;

designating means for designating whether an outgoing call to be subsequently executed is executed to the external line or the extension; and selecting means for selecting one of a G3 mode and a G4 mode in accordance with a designation by said designating means and the first and second information stored in said memory means.

17. An apparatus according to claim 16, wherein said selecting means, having selected the G4 mode and then a communication in the G4 mode having failed, selects the G3 mode.

18. An apparatus according to claim 16, wherein said designating means further comprises a touch panel.

* * * * *

UNITED STATES PATENT AND TRADEMARK OFFICE
CERTIFICATE OF CORRECTION

PATENT NO. : 5,719,688

DATED : February 17, 1998

INVENTOR(S): NAOTO KAGAMI

It is certified that error appears in the above-identified patent and that said Letters Patent is hereby corrected as shown below:

On title page, item

[56] REFERENCES CITED

U.S. Patent Documents
  Insert: --4,733,303  3/1988 Koshiishi ... 358/400--.
  Insert: --4,864,602  9/1989 Yamamoto et al. ... 379/100--.

COLUMN 5

Line 17, "3" should be deleted.

COLUMN 7

Line 21, "extension" should read --extension,--.
Line 23, "of the" (second occurrence) should read
    --of ports, the--.

Signed and Sealed this

Fourteenth Day of July, 1998

Attest:

BRUCE LEHMAN

Attesting Officer        Commissioner of Patents and Trademarks